United States Patent
Aaron, III

(12)
(10) Patent No.: US 6,367,846 B1
(45) Date of Patent: Apr. 9, 2002

(54) CONNECTOR FOR PIPE SECTIONS HAVING INTEGRAL BUOYANCY CANS

(75) Inventor: John W. Aaron, III, Cypress, TX (US)

(73) Assignee: Specialty Piping Components, Inc., Houston, TX (US)

( * ) Notice: Subject to any disclaimer, the term of this patent is extended or adjusted under 35 U.S.C. 154(b) by 0 days.

(21) Appl. No.: 09/611,390

(22) Filed: Jul. 7, 2000

(51) Int. Cl.$^7$ .............................. F16L 3/00; E21B 33/037
(52) U.S. Cl. .................... 285/123.15; 285/24; 285/363; 285/368; 166/335; 166/350; 166/359; 166/367
(58) Field of Search ............... 285/123.15, 24; 166/335, 350, 359, 367

(56) References Cited

U.S. PATENT DOCUMENTS

| | | | | |
|---|---|---|---|---|
| 237,544 A | * | 2/1881 | Jonson | 285/45 |
| 2,423,213 A | * | 7/1947 | Weber | 285/47 |
| 2,871,035 A | * | 1/1959 | Kaiser | 285/123.15 |
| 3,354,951 A | * | 11/1967 | Savage et al. | 166/341 |
| 3,482,626 A | * | 12/1969 | Gainsboro et al. | 165/155 |
| 3,981,357 A | * | 9/1976 | Walker et al. | 166/359 |
| 4,108,476 A | * | 8/1978 | Krupp | 285/47 |
| 4,336,958 A | | 6/1982 | Goetzinger | 285/55 |
| 4,452,474 A | | 6/1984 | Hagner | 285/334.1 |
| 4,475,749 A | * | 10/1984 | Pforr et al. | 285/47 |
| 4,573,527 A | * | 3/1986 | McDonough | 165/154 |
| 4,620,731 A | | 11/1986 | Rushing | 285/353 |
| 4,648,632 A | | 3/1987 | Hagner | 285/334.1 |
| 4,732,414 A | * | 3/1988 | Inaba | 285/133.1 |
| 4,819,388 A | * | 4/1989 | Kirkland | 51/411 |
| 4,997,211 A | * | 3/1991 | Brücher | 285/41 |

* cited by examiner

*Primary Examiner*—B. Dayoan
*Assistant Examiner*—Carlos Lugo
(74) *Attorney, Agent, or Firm*—Gray Cary Ware & Freidenrich, LLP

(57) ABSTRACT

A coupling for two pipe sections having integral buoyancy cans, wherein the coupling includes two coupling flanges, each having an inner flange portion configured to couple the pipe stems of the pipe sections and an outer flange portion configured to brace or secure the buoyancy cans of the pipe sections against each other and thereby stabilize the pipe sections. In one embodiment, the inner and outer flange portions of each coupling flange are connected by a plurality of connecting plates. Each coupling flange also includes a plurality of reinforcing plates between the inner and outer flange portions. Each of the inner flange portions is configured as a female box flange. In one embodiment, a pin flange is positioned between the inner flange portions in the assembled coupling to form pin-and-box connections with the inner flange portions. The outer flange portions are bolted together to secure the coupling. In another embodiment, the coupling flanges have complementary tapered mating surfaces which are used in conjunction with a tapered seal ring to form the connection between the pipe stems of the pipe sections. In this embodiment, a plurality of bolts positioned adjacent to the inner flange portions are used to provide a load on the seal ring and ensure a good seal.

17 Claims, 4 Drawing Sheets

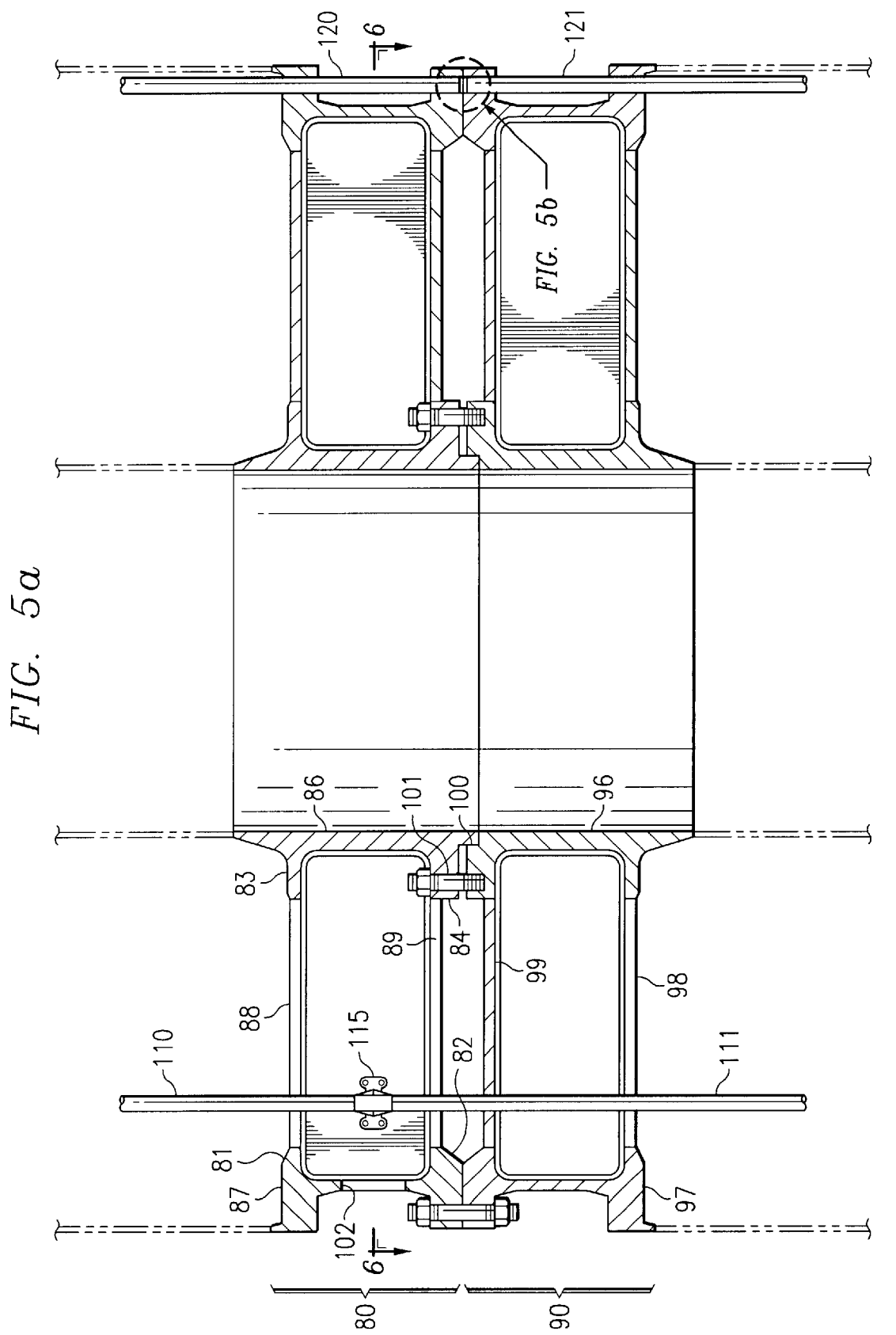

US 6,367,846 B1

CONNECTOR FOR PIPE SECTIONS HAVING INTEGRAL BUOYANCY CANS

BACKGROUND OF THE INVENTION

1. Field of the Invention

The invention relates generally to pipe couplings and more specifically to an improved coupling which is used to connect pipe sections, wherein each of the pipe sections has a integral buoyancy can surrounding the pipe.

2. Related Art

Pipelines are commonly used to transport oil and other hydrocarbons. Because of the enormous quantities of oil and/or hydrocarbons which need to be transported in this manner, the pipelines are typically constructed on a correspondingly large scale.

Pipelines of this type normally formed by a series of pipe segments, or sections. The pipe sections are individually manufactured, then transported to the site where the pipeline will be installed. At the installation site, the pipe sections are aligned and joined together to form the single conduit of the pipeline. The pipe sections normally include a flange at each end which can be coupled (e.g., bolted) to a corresponding flange of an adjacent pipe section. The pipe sections may, for example, utilize standard ANSI flanges.

Because of the scale of these pipelines, it may be very difficult to work with the pipe sections. The immense weight of individual pipe sections, for example, may make it difficult to suspend them so that they can be properly oriented before bolting them together. One way to make it easier to manipulate the pipe sections in a marine environment is to construct the pipe sections with integral buoyancy cans. The buoyancy cans increase the volume of the pipe sections so that they displace more water and, as a result, become more buoyant.

Referring to FIG. 1, a cross-sectional diagram illustrating a prior art structure of a pipe section having a buoyancy can is shown. Only one end of pipe section 10 is shown in the figure. The opposite end of the pipe section would normally be a mirror image of the illustrated end. Pipe stem 12 forms the conduit 13 through which fluid will be transported in the assembled pipeline. At each end of pipe stem 12 is a flange 14. As noted above, flange 14 may be an ANSI flange or any other flange which is used in the industry.

The buoyancy can comprises an outer, cylindrical wall 16 to which a plate 18 is connected at each end. Cylindrical wall 16 and end plate 18 are typically welded together. End plate 18 is also welded to pipe stem 12, which extends through the aperture in the center of the annular plate. Together, pipe stem 12, cylindrical wall 16 and end plates 18 form a cavity 19. When pipe section 10 is submerged, the buoyancy displaces a volume of water approximately equal to the volume of cavity 19, making the pipe section more buoyant and more easy to manipulate.

Although these pipe sections are manufactured with buoyancy cans, they are typically still coupled to each other in the same manner as pipe sections which do not have buoyancy cans—using standard bolted flanges. Referring to FIG. 2, a diagram illustrating a pair of coupled pipe sections is shown. One of the problems with coupling pipe sections 10 and 20 together in this manner is that, while the pipe sections are more buoyant than pipe sections that do not incorporate buoyancy cans, they are nevertheless heavier and subject to greater inertia. Further, because of their larger size, the pipe sections having buoyancy cans are subject to greater environmental forces, such as ocean currents. Consequently, the couplings of these pipe sections may be subject to greater stresses which may result in a higher rate of failure of the couplings.

It would therefore be desirable to provide a coupling for pipe sections having integral buoyancy cans, wherein the coupling is configured to handle the higher stresses associated with this type of pipe section.

SUMMARY OF THE INVENTION

One or more of the problems outlined above may be solved by the various embodiments of the invention. Broadly speaking, the invention comprises a coupling for two pipe sections having integral buoyancy cans, wherein the coupling includes an inner flange configured to couple the pipe stems of the pipe sections and an outer flange configured to brace or secure the buoyancy cans of the pipe sections against each other and thereby stabilize the pipe sections.

In one embodiment, the coupling comprises a pair of flanges, each of which is attached to one of a pair of pipe sections. Each of the pipe sections has a pipe stem and a cylindrical buoyancy can which is positioned coaxially with the pipe stem. Each of the flanges has an inner flange portion and an outer flange portion. The inner flange portions are connected to the pipe stems of the respective pipe sections. Each of the inner flange portions is configured as a female box flange. When the coupling is assembled, a pin flange is positioned between the inner flange portions to form what is essentially a pin-and-box connection. The outer flange portions are positioned near the outer edges of the respective buoyancy cans. When the coupling is assembled, the outer flange portions are secured together, thereby securing the buoyancy cans of the pipe sections together and stabilizing the coupling, including the connection between the inner flange portions.

In one embodiment, the inner and outer flange portions of each pipe section are connected by a first annular plate that forms the end of the buoyancy can. The inner and outer flange portions extend forward from the first annular plate (away from the buoyancy can) and are also connected by a second annular plate which is positioned near the forward end of the flange portions. A cavity is thereby formed between the inner and outer flange portions and between the first and second annular plates. A plurality of reinforcing plates are positioned in the cavity and attached to the flange portions and the annular plates. These reinforcing plates are oriented so that they are co-planar with the axis of the pipe section to provide additional strength in the flange assembly.

The present coupling may provide a number of advantages over the prior art. For example, the present coupling may be better able to withstand bending stresses between the pipe sections because of the larger overall diameter of the coupling. Further, because each of the flange assemblies forms a box flange for a pin-and-box coupling, the flange assemblies have no protruding surfaces which might be easily damaged during manufacture or shipping. Further, the present coupling may eliminate the need for a separate end plate to be welded to the buoyancy can to hold it in position around the pipe stem (since the coupling itself serves this function.) Still further, the present coupling may make it easier to position the pipe sections for assembly because the flanges are bolted together near the outer diameter of the buoyancy can, rather than near the pipe stem (thereby eliminating the need for a worker to position himself between the buoyancy cans while bolting the flanges together.

BRIEF DESCRIPTION OF THE DRAWINGS

Other objects and advantages of the invention may become apparent upon reading the following detailed description and upon reference to the accompanying drawings in which:

FIGS. 5a and 5b are cross-sectional views of an alternate embodiment of the present coupling.

FIG. 6 is an alternate cross-sectional view of the embodiment of the present coupling illustrated in FIG. 5a.

Figure 1:
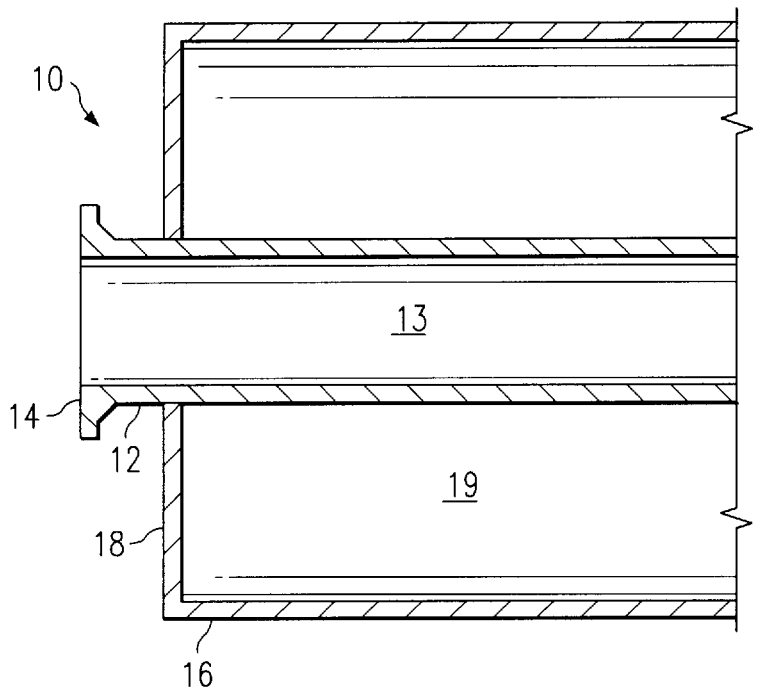
FIG. 1 is a cross-sectional diagram illustrating the structure of a pipe section having a buoyancy can.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the spirit and scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the present coupling comprises a pair of flanges, each of which is attached to one of a pair of pipe sections having integral buoyancy cans. The coupling flanges form a sealing connection between the pipe stems of the pipe sections, and also couple the buoyancy cans of the pipe sections together to provide greater stability between the pipe sections than is achieved by simply securing the pipe stems to each other.

In one embodiment, each coupling flange forms a part of the buoyancy can for the corresponding pipe section. Each of the flanges has an inner flange portion and an outer flange portion. The inner flange portions are connected to the pipe stems of the respective pipe sections and are configured to form a sealing connection between the pipe stems (so that the conduits formed by the pipe stems can be connected to form a single pipeline.) The outer flange portions are connected to the outer walls of their respective buoyancy cans. Each of the outer flange portions is connected to its respective inner flange portion by a pair of annular plates so that the inner and outer flange portions of a pipe section form a single coupling flange, or flange assembly. One of the annular plates serves as the end of the buoyancy can. In one embodiment, each of the inner flange portions is configured as a female box flange. In the assembled coupling, the inner flange portions form a seal with a pin flange that is positioned between them. The inner flange portions are not directly secured to each other, but are instead held in place by securing the outer flange portions to each other.

Figure 2:
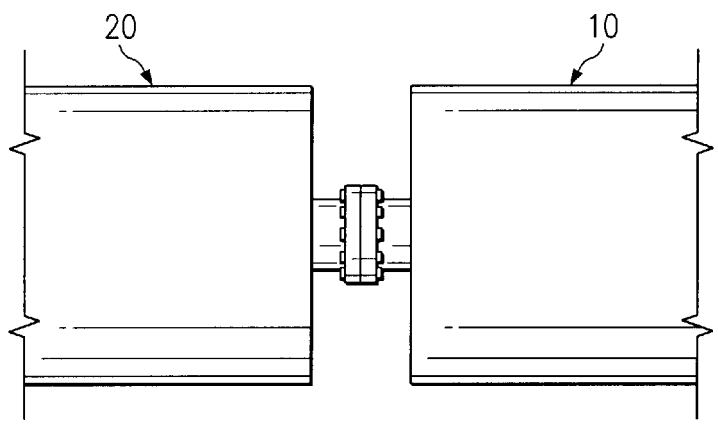
FIG. 2 is a diagram illustrating the coupling between a pair of pipe sections having buoyancy cans.
Figure 3:
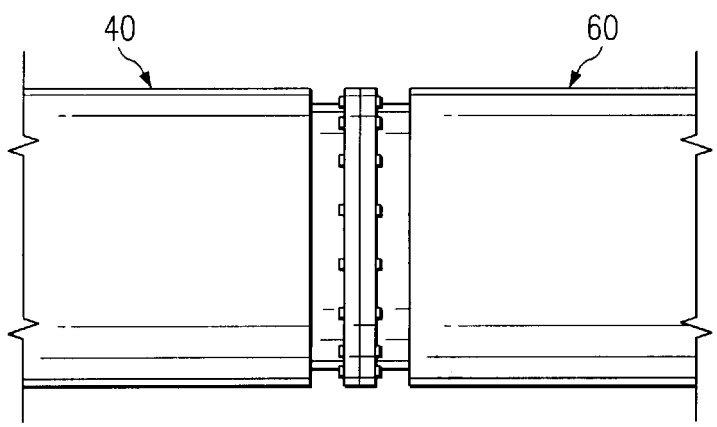
FIG. 3 is a diagram illustrating a pair of coupled pipe sections using one embodiment of the present coupling.

Referring to FIG. 3, a diagram illustrating a pair of coupled pipe sections using one embodiment of the improved coupling is shown. It can be seen from this figure that the diameter of the coupling is substantially larger than the flanges which form the coupling shown in FIG. 2. While both couplings are bolted together in essentially the same manner, the coupling of FIG. 3 can withstand greater bending stresses because of its larger diameter. The larger diameter of the present coupling may also allow more bolts to be used to secure the coupling.

Figure 4:
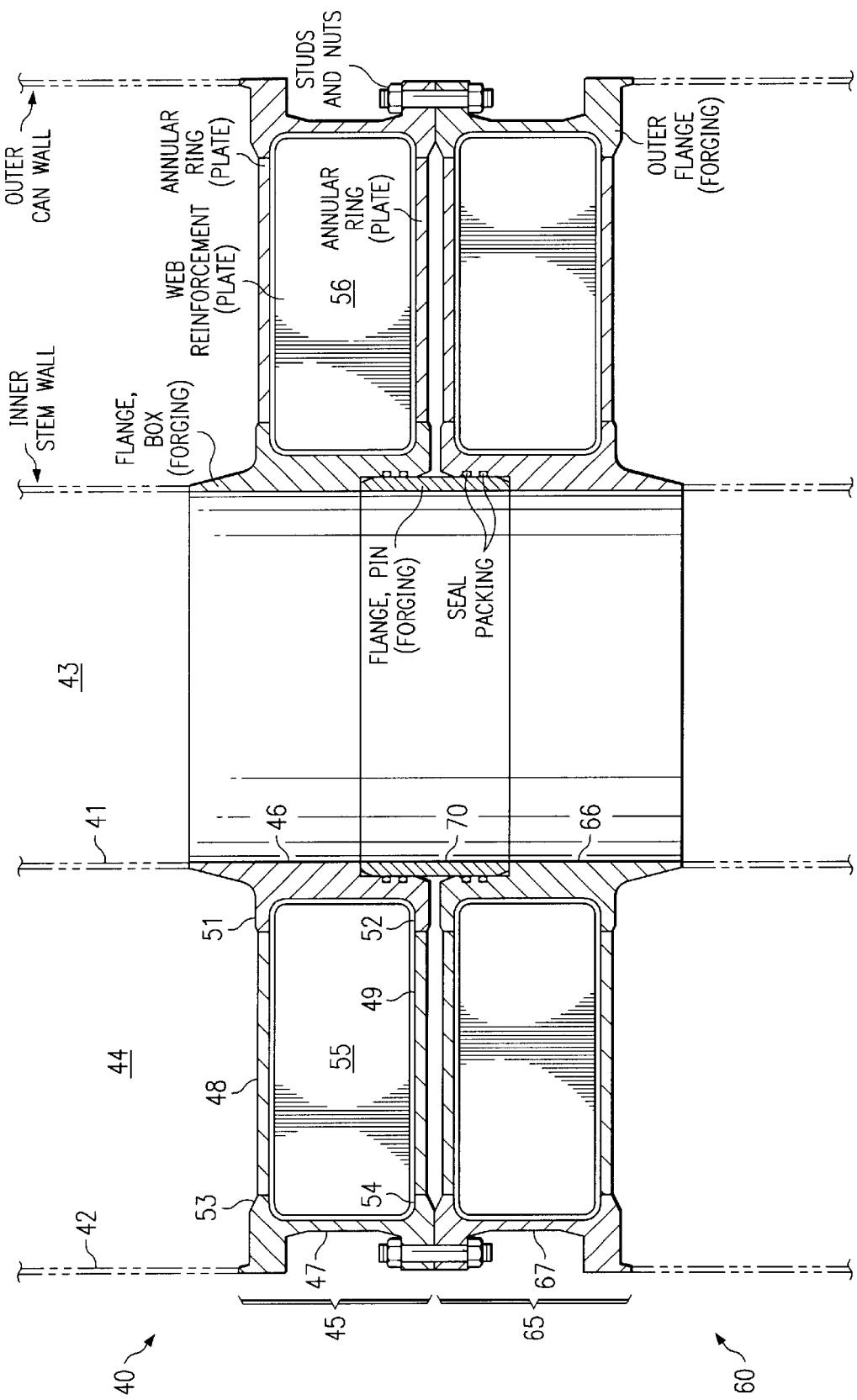
FIG. 4 is a cross-sectional view of one embodiment of the present coupling.

Referring to FIG. 4, a cross-sectional view of one embodiment of the improved coupling is shown. This coupling is configured to secure a first pipe section 40 to a second pipe section 60. Because each of the pipe sections, including their respective coupling flanges, are identical in this embodiment, they will be described with reference only to the first pipe section 40.

The first pipe section 40 generally comprises pipe stem 41 and buoyancy can 44. Buoyancy can 44 is held in position around pipe stem 41 by flange assembly 45. In fact, in this embodiment, annular plate 48 replaces the annular plate that forms the end of the buoyancy can in the prior art.

Flange assembly 45 comprises an inner flange portion 46, an outer flange portion 47, a first annular plate 48 and a second annular plate 49. Inner flange portion 46 defines the end of pipe stem 41 and corresponding conduit 43. Inner flange portion 46 is essentially a box flange as used in a pin-and-box coupling. Inner flange portion 46 is configured to mate with pin flange 70. Seal packing may be provided between inner flange portion 46 and pin flange 70 to ensure that a tight seal is formed therebetween.

Inner flange portion 46 does not include means to secure itself against pin flange 70 or inner flange portion 66. Inner flange portion 46 is instead secured by outer flange portion 47, which is bolted to outer flange portion 67. Inner flange portion 46 has two outwardly facing ridges, 51 and 52, which are configured to be welded to the inner edges of corresponding annular plates 48 and 49. Outer flange portion 47 also has two ridges, 53 and 54. Ridges 53 and 54 are inwardly facing and are configured to be welded to the outer edges of annular plates 48 and 49. Inner flange portion 46 is thereby held rigidly in position with respect to outer flange portion 47 so that, when our flange portion 47 is bolted to outer flange portion 67, inner flange portion 46 is secured against pin flange and 70 and inner flange portion 66.

In one embodiment, inner flange portion 46 is welded to pipe stem 41, while outer flange portion 47 is welded to the outer wall 42 of the buoyancy can. It is contemplated that there may be some embodiments in which outer flange portion 47 is not welded or otherwise connected directly to buoyancy can outer wall 42. Outer flange portion 47 (and outer flange portion 67) may instead simply act as a brace between the buoyancy cans to prevent bending between the pipe sections.

Because the diameter of the present coupling (i.e., flange assembly 45 and flange assembly 65) is greater than the diameter of couplings in the prior art, the present coupling can withstand greater bending stresses between pipe section 40 and pipe section 60. In some embodiments, however, the present coupling can be made even stronger. This is accomplished by inserting a plurality of reinforcing plates (e.g., 55 and 56) within the generally toroidal, or donut-shaped, cavity formed by inner flange portion 46, outer flange portion 47, first annular plate and 48 and second annular plate 49. While only two reinforcing plates are shown in each of the flange assemblies in FIG. 4, more may be used. The plates should be evenly spaced within the cavity, and it is contemplated that the optimal number of such plates is typically between four and eight.

Each of the reinforcing plates is oriented to be co-planar with the axis of the pipe section. In other words, each reinforcing plate extends radially outward from the axis, as well as longitudinally, or parallel to the axis. This provides the maximum tensile and crush strength parallel to the axis of the pipe section and thereby strengthens the flange assembly against bending stresses. The positioning of the reinforcing plates also strengthens annular plate 48 which holds buoyancy can 42 in position with respect to pipe stem 41. After the reinforcing plates are properly positioned, they are welded in place.

Referring to FIG. 5*a,* a cross-sectional view of an alternate embodiment of the improved coupling is shown. This coupling is configured to secure a first pipe section which is connected to coupling flange 80 to a second type section which is connected to coupling flange 90. Many aspects of coupling flanges 80 and 90 are identical and will be described with respect to only one of the flanges. Aspects of coupling flanges 80 and 90 which are different between the two flanges will be described separately for each flange.

Again, each pipe section comprises a pipe stem and a buoyancy can. The pipe stems of the two pipe sections are coupled together by inner flange portions 86 and 96 to form a single conduit. Each flange also comprises an outer flange portion 87, 97. The inner and outer flange portions are connected to each other by means of a plurality of reinforcement plates 88, 89, 98, 99. In this embodiment, the coupling flanges are integral with the buoyancy cans. That is, the inner and outer flange portions of each flange (e.g., 87 and 86), in conjunction with one of the reinforcement plates (e.g., 89), form of the end of the buoyancy can for the corresponding pipe section.

In the embodiment shown in FIG. 5*a,* inner flange portions 86 and 96 are configured with complementary male and female mating surfaces, rather than each being a box flange. The mating surfaces of each of the inner flange portions is tapered to form a frusto-conical surface. When the coupling is assembled, a tapered seal ring 100 is positioned between the mating surfaces to ensure a good seal between the inner flange portions.

Because the coupling uses a tapered seal ring and inner flange portions with tapered mating surfaces, it is necessary to provide a sufficient load on the seal ring to ensure a good seal. The coupling therefore uses a plurality of studded bolts 101 positioned around the periphery of the inner flange portions to secure the inner flange portions to each other and to compress the seal ring. Studded bolts are used in this embodiment to avoid potential leak paths that could be created by bolt holes.

The embodiment which is shown in FIG. 5*a* has ridges 81–84 for attaching plates 88 and 89 which couple inner flange portion 86 to outer flange portion 87. In this embodiment, plates 88 and 89 are substantially rectangular, rather than having the annular shape which is shown in the embodiment of FIG. 4. This can be seen more clearly in FIG. 6, which is a cross sectional view of coupling flange 80, viewed from along the axis of the pipe section. These figures also show water vent 102, which allows water to flow into the area between inner flange portion 86 and outer flange portion 87. (There are a plurality of vents identical to vent 102 which are spaced around the periphery of outer flange portion 87.)

It can be seen from these figures that the interior of the buoyancy can is open to the sea. Because the pipe section is intended to be oriented vertically, vent 102 is positioned at the lower end of the buoyancy can. The upper end of the buoyancy can is sealed, as shown by the can to which coupling flange 90 is attached. Consequently, when pressurized air is forced into the buoyancy can, water in the buoyancy can exits through vent 102. Conversely, when air is released from the buoyancy can, water enters the can through the water vents. By forcing the air into the buoyancy can or releasing air from the buoyancy can, the overall buoyancy of the pipe section can be controlled. The buoyancy of the pipe section can therefore be adjusted whenever necessary to optimize it for a particular depth.

It should be noted that vent 102, in addition to allowing water in and out of the buoyancy can, provides access to the bolts around inner flange portions 86 and 96. It is contemplated that the bolts which secure the inner flange portions can easily be installed with a tool such as a hydraulic ratchet.

It should be noted that coupling flange 90 does not allow fluid communication between the interior of the buoyancy can and the open sea. Coupling flange 90, is intended to be positioned at the upper end of a vertically oriented pipe section and to mate with coupling flange 80. Because coupling flange 90 is positioned at the top of the buoyancy can, it must be sealed to ensure that air contained in the buoyancy can does not escape and alter the buoyancy of the pipe section. Consequently, plate 99 is annular in shape and is welded to inner flange portion 96 and outer flange portion 97 around its entire circumference to form a sealed bulkhead. As noted above, studded bolts are used to secure the inner flange portions instead of bolts similar to those used to secure the outer flange portions. The use of the studded bolts allows the inner flange portions to be secured together without having to provide holes in inner flange portion 96, which would likely allow air to escape from the buoyancy can.

Another feature which is shown in the embodiment of FIGS. 5*a,* 5*b* and 6 is the use of air lines to deliver pressurized air to the buoyancy cans. FIGS. 5*a,* 5*b* and 6 show two different ways to incorporate these lines into the design of the coupling flange. It should be noted that either of the two different installations can be used in a given embodiment. Whichever of the two installations is used, the installed air line is used to deliver pressurized air to one of the buoyancy cans. In the embodiment shown in FIG. 6, six air lines are shown. These lines can service the buoyancy cans of six pipe sections. Each of the air lines passes entirely through the buoyancy can above the one which is serviced by that line. The line opens into the buoyancy can which it services, so that it can deliver pressurized air to that buoyancy can.

The first type of installation of an air line is shown on the left side of FIG. 5*a.* In this installation, air line 111 passes through an aperture in plate 99, which serves as a bulkhead at the upper end of the buoyancy can. Air line 111 is welded to plate 99 to ensure the integrity of the seal at the upper end of the buoyancy can. Air line 111 may service the buoyancy can connected to coupling flange 90, or it may pass through to another buoyancy can. Air line 110 passes through the buoyancy can connected to coupling flange 80 and is connected to air line 111 by clamp 115. As shown in FIG. 6, air line 110 passes through an open space in coupling flange 80 rather than through plate 89. When coupling flanges 80 and 90 are secured to each other, air lines 110 and 111 are also connected. The connection can be accessed and clamp 115 installed via water vent 102.

Figure 5B:
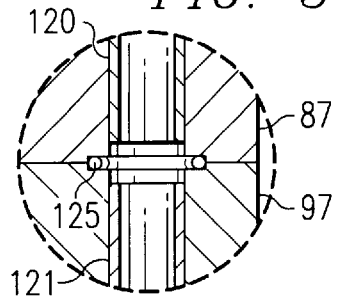
Figure 6:
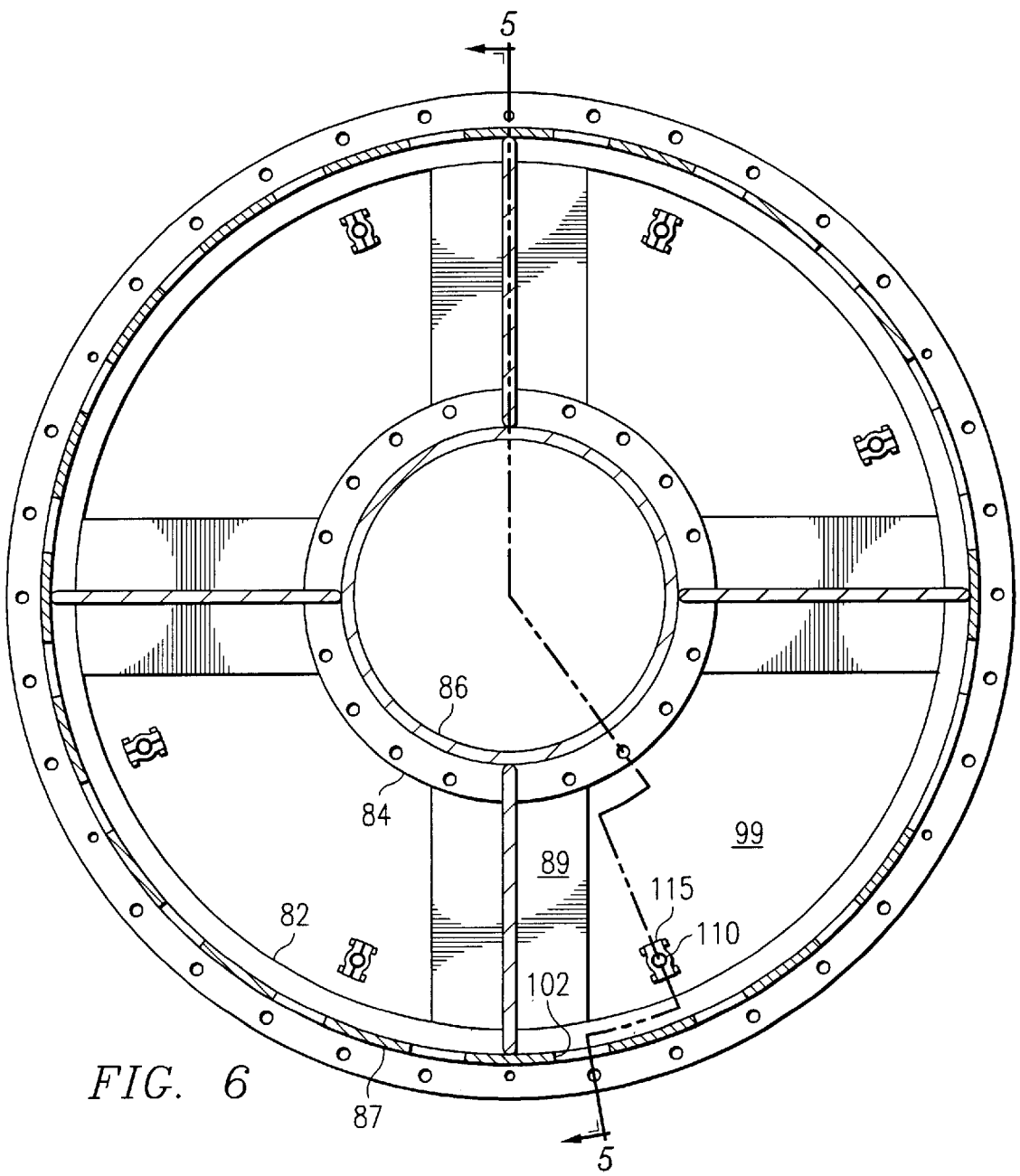

The second type of air line installation is shown on the right side of FIG. 5*a* and in FIG. 5*b.* In this installation, instead of passing between the inner and outer flange portions, the air lines are routed through the outer flange portions. Referring to FIG. 5a, air line 120 passes through the upper buoyancy can, through an upper part of outer flange portion 87, and into a bolt hole in outer flange portion 87. Similarly, air line 121 passes through the lower buoyancy can, through a lower part of outer flange portion 97, and into a bolt hole in outer flange portion 97. Each of the air lines is fillet welded within its respective bolt hole. As shown in FIG. 5b, air lines 120 and 121 are coupled together by placing seal 125 between the bolt holes and securing the outer flange portions together (by bolting them together using the remaining bolt holes.) the seal allows an airtight conduit to be formed through air lines 120 and 121. (It should be noted that the air lines need not be coupled through bolt holes, but this is contemplated to be a convenient modification to the coupling flange design.)

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A coupling for use with pipe sections having central pipe stems and coaxially located buoyancy cans, wherein the coupling comprises:
   a pair of coupling flanges, each of the coupling flanges having an inner flange portion configured to be connected to the pipe stem of the corresponding pipe section, and an outer flange portion positioned near the periphery of the corresponding buoyancy can;
   wherein each of the coupling flanges is configured to be connected to one of the pipe sections;
   wherein when the coupling flanges are secured to each other, a seal is formed between the pipe stems of the pipe sections and the outer flange portions form a brace between the buoyancy cans of the pipe sections; and
   wherein the outer flange portion of at least one of the coupling flanges comprises one or more water vents.

2. A coupling for use with pipe sections having central pipe stems and coaxially located buoyancy cans, wherein the coupling comprises:
   a pair of coupling flanges, each of the coupling flanges having an inner flange portion configured to be connected to the pipe stem of the corresponding pipe section, and an outer flange portion positioned near the periphery of the corresponding buoyancy can;
   wherein each of the coupling flanges is configured to be connected to one of the pipe sections;
   wherein when the coupling flanges are secured to each other, a seal is formed between the pipe stems of the pipe sections and the outer flange portions form a brace between the buoyancy cans of the pipe sections; and
   wherein each of the coupling flanges further comprises one or more connecting plates which are connected between the inner flange portion and the outer flange portion.

3. The coupling of claim 2 wherein at least one of the one or more connecting plates comprises an annular plate which is perpendicular to the axis of the pipe section.

4. The coupling of claim 3 wherein the annular plate forms an air-tight bulkhead which is integral with the buoyancy can.

5. The coupling of claim 2 wherein at least one of the one or more connecting plates comprises a substantially rectangular plate, a first edge of which is welded to the inner flange portion, and an opposite edge of which is coupled to the outer flange portion.

6. A coupling for use with pipe sections having central pipe stems and coaxially located buoyancy cans, wherein the coupling comprises:
   a pair of coupling flanges, each of the coupling flanges having an inner flange portion configured to be connected to the pipe stem of the corresponding pipe section, and an outer flange portion positioned near the periphery of the corresponding buoyancy can; and
   a plurality of reinforcing plates connected to at least one of the coupling flanges;
   wherein each of the coupling flanges is configured to be connected to one of the pipe sections;
   wherein the plurality of reinforcing plates are oriented to be co-planar with the axis of the corresponding pipe section; and
   wherein when the coupling flanges are secured to each other, a seal is formed between the pipe stems of the pipe sections and the outer flange portions form a brace between the buoyancy cans of the pipe sections.

7. The coupling of claim 6 further comprising one or more connecting plates which are welded between the inner and outer flange portions and wherein the plurality of reinforcing plates are positioned between the inner and outer flange portions and are welded to the inner and outer flange portions and to the one or more connecting plates.

8. A coupling for use with pipe sections having central pipe stems and coaxially located buoyancy cans, wherein the coupling comprises:
   a pair of coupling flanges, each of the coupling flanges having an inner flange portion configured to be connected to the pipe stem of the corresponding pipe section, and an outer flange portion positioned near the periphery of the corresponding buoyancy can; and
   a seal positioned between the inner flange portion of a first one of the pair of coupling flanges and the inner flange portion of a second one of the pair of coupling flanges;
   wherein each of the coupling flanges is configured to be connected to one of the pipe sections; and
   wherein when the coupling flanges are secured to each other, a seal is formed between the pipe stems of the pipe sections and the outer flange portions form a brace between the buoyancy cans of the pipe sections.

9. The coupling of claim 8 wherein the seal comprises a seal ring having tapered, sealing surfaces.

10. A coupling for use with pipe sections having central pipe stems and coaxially located buoyancy cans, wherein the coupling comprises:
    a pair of coupling flanges, each of the coupling flanges having an inner flange portion configured to be connected to the pipe stem of the corresponding pipe section, and an outer flange portion positioned near the periphery of the corresponding buoyancy can;
    wherein each of the coupling flanges is configured to be connected to one of the pipe sections;
    wherein when the coupling flanges are secured to each other, a seal is formed between the pipe stems of the pipe sections and the outer flange portions form a brace between the buoyancy cans of the pipe sections; and
    wherein the inner flange portions comprise box flanges, the coupling further comprising a pin flange configured to mate with each of the box flanges.

11. A coupling for use with pipe sections having central pipe stems and coaxially located buoyancy cans, wherein the coupling comprises:

a pair of coupling flanges, each of the coupling flanges having an inner flange portion configured to be connected to the pipe stem of the corresponding pipe section, and an outer flange portion positioned near the periphery of the corresponding buoyancy can;

wherein each of the coupling flanges is configured to be connected to one of the pipe sections;

wherein when the coupling flanges are secured to each other, a seal is formed between the pipe stems of the pipe sections and the outer flange portions form a brace between the buoyancy cans of the pipe sections; and wherein the inner flange portion of each coupling flange includes a tapered mating surface, wherein the tapered mating surface of the inner flange portion of each coupling flange is substantially complementary to the tapered mating surface of the inner flange portion of the other coupling flange.

12. The coupling of claim 11 further comprising a plurality of bolts positioned around the periphery of the inner flange portions to secure the inner flange portions to each other.

13. A pipe section comprising:

a pipe stem;

a buoyancy can connected to the pipe stem, wherein the buoyancy can surrounds the pipe stem;

an upper coupling flange connected to an upper end of the pipe section;

a lower coupling flange connected to a lower end of the pipe section; and one or more air lines extending through the upper coupling flange, wherein at least one of the air lines is open to the interior of the buoyancy can;

wherein each of the upper and lower coupling flanges comprises an inner flange portion connected to the pipe stem and an outer flange portion connected to the buoyancy can;

wherein for each of the upper and lower coupling flanges, the inner flange portion is configured to be coupled to an inner flange portion of an adjacent pipe section; and wherein for each of the upper and lower coupling flanges, the outer flange portion is configured to be coupled to an outer flange portion of an adjacent pipe section.

14. The pipe section of claim 13 wherein an upper end of each air line extends above the upper coupling flange, wherein the upper end of the air line is configured to be coupled to the lower end of an air line of another pipe section by clamping the upper end of the air line to the lower end of the air line of the other pipe section.

15. The pipe section of claim 13 wherein an upper end of the air line is integral with and terminates at a coupling face of the upper coupling flange, wherein when the upper coupling flange is coupled to a complementary flange, the upper end of the air line is coupled to another air line which is integral with the other coupling flanges.

16. A pipe section comprising:

a pipe stem;

a buoyancy can connected to the pipe stem, wherein the buoyancy can surrounds the pipe stem;

an upper coupling flange connected to an upper end of the pipe section;

a lower coupling flange connected to a lower end of the pipe section; and a plurality of water vents in the lower coupling flange, wherein the plurality of water vents provide fluid communication between the interior of the buoyancy can and the exterior of the buoyancy can;

wherein each of the upper and lower coupling flanges comprises an inner flange portion connected to the pipe stem and an outer flange portion connected to the buoyancy can;

wherein for each of the upper and lower coupling flanges, the inner flange portion is configured to be coupled to an inner flange portion of an adjacent pipe section; and wherein for each of the upper and lower coupling flanges, the outer flange portion is configured to be coupled to an outer flange portion of an adjacent pipe section.

17. A coupling for use with pipe sections having central pipe stems and coaxially located buoyancy cans, wherein the coupling comprises:

a pair of coupling flanges, each of the coupling flanges having an inner flange portion connected to the pipe stem of the corresponding pipe section, an outer flange portion connected to the inner flange portion, wherein the outer flange portion is positioned radially outward from the inner flange portion near the periphery of the corresponding buoyancy can, wherein the outer flange portion is connected to the corresponding buoyancy can, wherein the outer flange portion of each coupling flange is bolted to the outer flange portion of the other coupling flange, a pair of annular plates connected to the inner and outer flange portions, wherein a toroidal cavity is formed between the annular plates and the inner and outer flange portions, and a plurality of reinforcing plates positioned within the toroidal cavity and oriented to be co-planar with the axis of the corresponding pipe section, wherein the reinforcing plates are connected to one or more of the annular plates and the inner and outer flange portions, a pin flange positioned between the coupling flanges and configured to mate with the inner flange portions of each of the coupling flanges to form a seal between the coupling flanges, wherein when the coupling flanges are secured to each other, a seal is formed between the pipe stems of the pipe sections and the outer flange portions form a brace between the buoyancy cans of the pipe sections.

\* \* \* \* \*